Patented Feb. 11, 1947

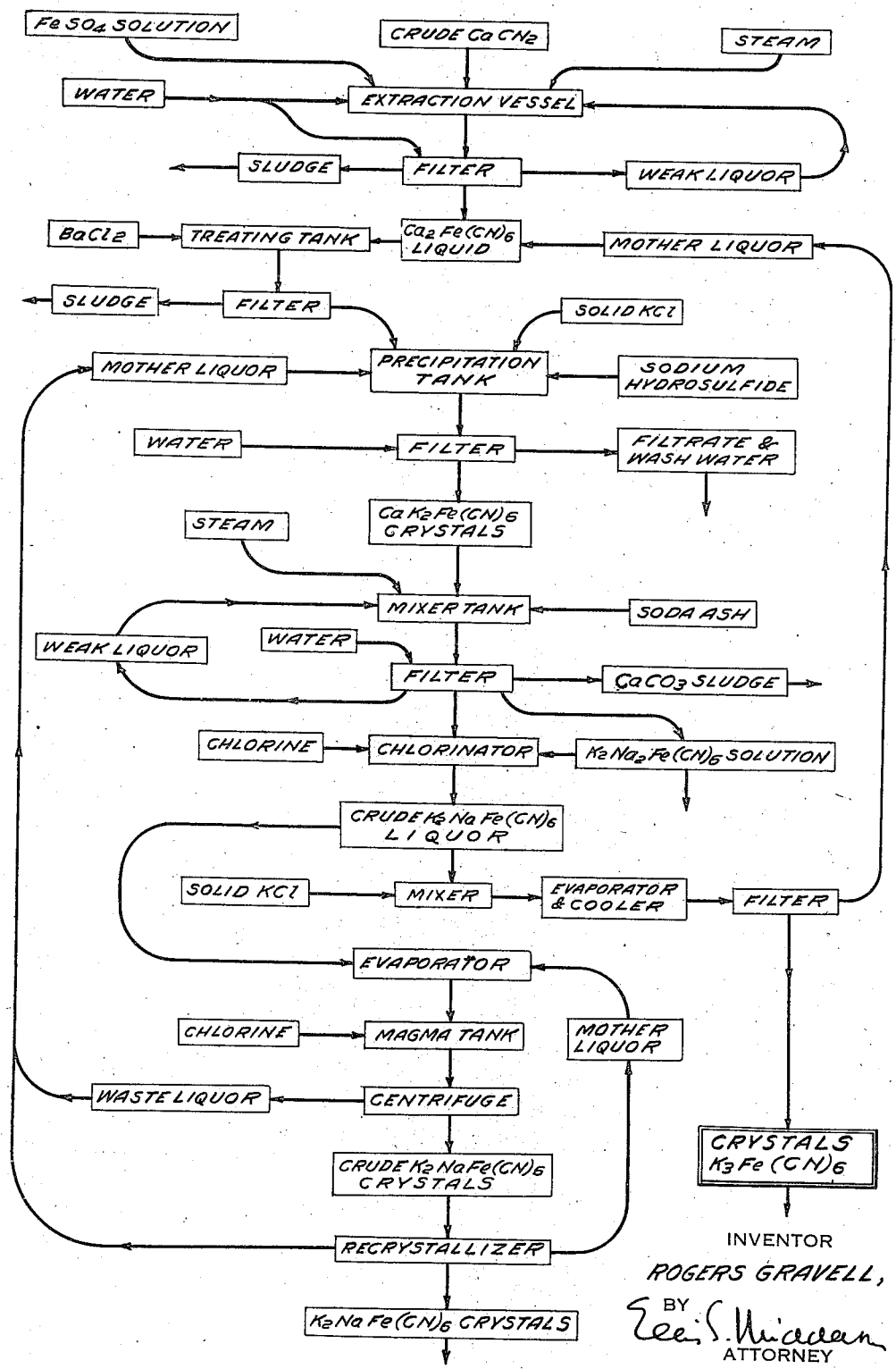

2,415,792

UNITED STATES PATENT OFFICE 2,415,792

PREPARATION OF POTASSIUM FERRICYANIDE

Rogers Gravell, Linden, N. J., assignor to American Cyanamid Company, New York, N. Y., a corporation of Maine Application September 19, 1945, Serial No. 617,262

2 Claims. (Cl. 23—77)

The present invention relates to the preparation of alkali metal ferri and ferrocyanides and specifically to $K_2Na_2Fe(CN)_6$, $K_2NaFe(CN)_6$ and $K_3Fe(CN)_6$ or any of them.

The principal object of the invention is the preparation of one or more of the above substances from a cheap source of raw materials as a complete cyclic process without undue waste and without relying upon any other or related process to take values which would otherwise be lost.

The alkali metal ferri and ferrocyanides are of particular value in the industry in that they are used extensively as photographic reagents and as intermediates in the production of iron blue complexes for pigments or the like.

These complex iron cyanides may be readily prepared from a cyanogen compound such as crude calcium cyanide and ferrous sulfate but due to the chemical affinity of the $Fe(CN)_6$ radical for the calcium, difficulty has heretofore been encountered in forming the alkali metal salt. It has been discovered that by judicious choice of the intermediate alkali or alkaline earth metal ferrocyanide, paying particular attention to its ease of formation and insolubility in the menstruum in which it is formed, a perfect and operative process results.

For instance, calcium ferrocyanide may readily be formed by reacting a solution of calcium cyanide with ferrous sulfate. One of the calcium atoms only may be readily replaced by potassium through reaction with potassium chloride, for instance. The other calcium atom cannot be replaced as such with potassium even though large quantities of potassium chloride are added at this stage. On the contrary, however, this remaining calcium atom may be readily replaced with sodium as by reaction with soda ash to form $K_2Na_2Fe(CN)_6$. This material may either be recovered as such in solid form or one of its sodium atoms may be then knocked out with chlorine to form $K_2NaFe(CN)_6$ or this latter material may have its single sodium atom replaced with potassium through reaction with potassium chloride to form $K_3Fe(CN)_6$. While at first blush this would appear to be a roundabout method of arriving at an end product, yet by so doing advantage is taken of the ability of one material to replace another in a ferro or ferricyanide while at the same time choosing a material to be formed at that stage which is more insoluble in the menstruum than the by-products or impurities present there.

The invention further contemplates additional details as hereinafter more fully described and shown in the drawing in which the single figure is a flow sheet showing the preferred method of carrying out the invention.

Referring now to the flow sheet, crude calcium cyanide is placed in a heated extraction vessel to which water or wash liquor from a previous batch is added, in either case with the addition of an aqueous solution of ferrous sulfate ($FeSO_4 \cdot 7H_2O$), a 30 to 40% solution being preferred. As a result, the following reaction takes place:

1. 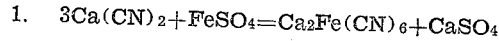 $3Ca(CN)_2 + FeSO_4 = Ca_2Fe(CN)_6 + CaSO_4$

Considerable heat is developed as the reaction progresses so that only a small quantity of steam is required to bring the temperature of the extraction menstruum to about 200° F. which is desired in order to bring about a complete and adequate extraction. The resulting slurry is filtered on a continuous filter of the Oliver type or the like and the calcium sulfate sludge washed with water at about 120° F. The wash water from the cake may be returned to the extraction vessel for an additional cycle. Where desired and in order to improve the speed of filtration, a small amount of calcium carbonate sludge, obtained later in the process, may be added to the slurry before filtration although this is not necessary.

This calcium ferrocyanide liquor contains some undesirable sulfate, usually about 0.3% calculated as potassium sulfate. Since the sulfate content of such liquors should be reduced to a minimum to produce good final products, the liquors may be passed to a treating tank, sufficient barium chloride added to precipitate the sulfate as barium sulfate, and the sludge removed as by filtering.

The thus purified calcium ferrocyanide is then transferred to a precipitation tank, heated to boiling with a steam coil and treated with an excess of solid potassium chloride with agitation. The calcium ferrocyanide liquor added to the precipitation tank contains about 16% of calcium ferrocyanide and from 6 to 7% sodium chloride, the latter having been present as an impurity in the crude calcium cyanide.

At this stage, there may also be added the mother liquor containing substantial quantities of $K_3Fe(CN)_6$ from a later part of the process and for the purpose of recovering values therein. Under the circumstances, approximately 20% of the ferrocyanide present at this stage may consist of ferrocyanide which has thus been recycled.

The quantity of KCl added represents an excess of about 30% above the theoretical required for the calcium ferrocyanide liquor used, based on the following reaction:

2. $Ca_2Fe(CN)_6 + 2KCl = CaK_2Fe(CN)_6 + CaCl_2$

The calcium ferrocyanide liquor contains reducing substances which ordinarily will reduce most of the ferricyanide to the ferro state. Any ferricyanide not so reduced may be converted by adding amounts of sodium hydrosulfide solution as required. The bulk of the ferrocyanide is precipitated as the sparingly soluble calcium potassium ferrocyanide and may be recovered by filtration, the cake being washed with a small amount of water. The washings and the filtrate containing the calcium chloride, the excess potassium chloride and the sodium chloride derived from the crude cyanide and recycled mother liquor, are discarded.

The cake of calcium potassium ferrocyanide is then transferred to a heated mixer equipped with an agitator and slurried with weak liquor obtained from a previous mixer batch. Soda ash solution in slight excess as determined by test, is added according to the following reaction:

3. $CaK_2Fe(CN)_6 + Na_2CO_3 = K_2Na_2Fe(CN)_6 + CaCO_3$ and the whole mass heated to boiling by means of a steam coil or the like. The resulting slurry is filtered to recover the precipitated calcium carbonate which is washed with water sufficient to yield the volume of weak liquor necessary for preparing the next batch. About 15% of the ferrocyanide present in any batch at this stage consists of liquor recirculated in this way.

The mother liquor from the filtrate contains $K_2Na_2Fe(CN)_6$, having a content of about 31% calculated as $K_3Fe(CN)_6$ and may be used as such in the arts, or evaporated and the crystals recovered for use.

In the event that it is not desired to recover $K_2Na_2Fe(CN)_6$, this mother liquor may then be transferred to a chlorinating tank, cooled to about 100° F. and oxidized by passing chlorine thereinto at such a rate that the temperature does not exceed 120° F. In the chlorinating tank, the following reaction occurs:

4. $K_2Na_2Fe(CN)_6 + Cl = K_2NaFe(CN)_6 + NaCl$

The end point is indicated by the virtual disappearance of ferrocyanide. The $K_2NaFe(CN)_6$ liquor thus produced contains the equivalent of about 31% potassium ferricyanide plus about 8% of sodium chloride derived from the ferrocyanide and excess soda ash. It may be filtered to remove a small amount of insoluble matter formed in the previous steps and transferred to a glass lined vacuum evaporator. The solution is heated to about 150° F., the vacuum applied and the evaporation continued by the introduction of steam to the jacket at such a rate that the temperature remains at about 160° F. and does not exceed 165° F. These conditions may be readily achieved by maintaining the vacuum at from about 27 to 29 inches mercury. Evaporation is continued until about 41% of the total weight of solution has been removed as water, the amount of water being evaporated according to the exact original concentration so that the mother liquor obtained by cooling the slurry to 60° F. will separate crystals of $K_2NaFe(CN)_6$. Where necessary, the evaporated liquor and its crystals may be transferred to a magma tank and chlorine added to reoxidize any ferricyanide which may have been reduced to ferrocyanide in the evaporation process. The mother liquor contains about 12% of total chloride calculated as chlorine. The evaporated liquor, containing any crystals which have separated during the evaporation, is then cooled under vacuum to about 60° F. and the resulting slurry filtered so as to collect the crude crystals of $K_2NaFe(CN)_6$. They may be further purified by recrystallization from water if desired. The crude crystals contain only about 4% water and small amounts of chlorides and ferrocyanides as impurities. When dried, the product contains 102% to 103% of ferricyanide calculated as potassium ferricyanide equivalent to 97 to 98% calculated as the double salt, with 0.3% to 0.6% chloride calculated as chlorine, and 0.3% to 0.6% ferrocyanide calculated as $\equiv Fe(CN)_6$. The liquor from the formation of crude and purified crystals of $K_2NaFe(CN)_6$ may be recycled, as previously mentioned, to the solution of calcium ferrocyanide for recovery of the values therein.

Where it is not desired to produce crystals from the $K_2NaFe(CN)_6$ liquor but on the contrary to convert it to $K_3Fe(CN)_6$, the crude $K_2NaFe(CN)_6$ liquor containing about 31% equivalent of $K_3Fe(CN)_6$ may be treated with 0.5 to 0.6 lb. of solid KCl to each pound of equivalent $K_3Fe(CN)_6$ present according to the following reaction:

5. $K_2NaFe(CN)_6 + KCl = K_3Fe(CN)_6 + NaCl$

It may then be evaporated until about 6% of the weight has been removed as water. The resulting solution, including any crystals which have separated during the evaporation, is then cooled to about 60° F. and the crystals of $K_3Fe(CN)_6$ separated as by filtration. The product consists essentially of $K_3Fe(CN)_6$ with about 4% of water and small amounts of chlorides and ferrocyanides as impurities. Actually it contains from 100 to 101% of ferricyanide calculated as $K_3Fe(CN)_6$, with 0.3 to 0.6% chloride calculated as chlorine, and 0.3 to 0.6% ferrocyanide calculated as $\equiv Fe(CN)_6$. Where desired, the crystals may be further purified by recrystallization from water.

From the above it will be apparent that a self-contained process has been designed for the preparation of $K_2Na_2Fe(CN)_6$, $K_2NaFe(CN)_6$ and $K_3Fe(CN)_6$ or any of them, recycling values into the process. As a result, improved yields are obtained with consequent reduction in costs over that heretofore thought possible.

While the invention has been described with particular reference to specific embodiments, it is to be understood that it is not to be limited thereto but is to be construed broadly and restricted solely by the scope of the appended claims.

I claim:

1. In a method of making $K_3Fe(CN)_6$ by extracting crude $Ca(CN)_2$ with water, adding ferrous sulfate thereto to form $Ca_2Fe(CN)_6$, adding solid KCl to the latter to form crystals of $CaK_2Fe(CN)_6$, separating out the latter, reacting the same with soda ash solution to form $K_2Na_2Fe(CN)_6$ and chlorinating the latter to form $K_2NaFe(CN)_6$, the improvement which includes adding solid KCl to the thus formed solution of $K_2NaFe(CN)_6$ to form $K_3Fe(CN)_6$ and recovering the latter through evaporation and cooling.

2. The method of claim 1 in which the mother liquor from the $K_3Fe(CN)_6$ recovery step is returned to cycle by addition to incoming $Ca_2Fe(CN)_6$ liquor.

ROGERS GRAVELL.